United States Patent [19]

Takahashi

[11] Patent Number: 4,520,685
[45] Date of Patent: Jun. 4, 1985

[54] SHIFT CONTROL MECHANISM OF AN AUTOMOTIVE MANUAL TRANSMISSION

[75] Inventor: Kotei Takahashi, Yokohama, Japan
[73] Assignee: Nissan Motor Co., Ltd., Japan
[21] Appl. No.: 350,389
[22] Filed: Feb. 19, 1982

[30] Foreign Application Priority Data

Feb. 20, 1981 [JP] Japan .................................. 56-22888

[51] Int. Cl.³ .............................................. B60K 20/00
[52] U.S. Cl. ................................................. 74/473 R
[58] Field of Search .................... 74/473 R, 477, 476

[56] References Cited

U.S. PATENT DOCUMENTS

| | | | |
|---|---|---|---|
| 3,216,274 | 11/1965 | Hurst, Jr. | |
| 3,495,131 | 2/1970 | Melcher | 339/17 CF |
| 3,962,930 | 6/1976 | Frazee | 74/477 |
| 4,277,983 | 7/1981 | Izumi et al. | 74/477 |
| 4,381,682 | 5/1983 | Kudo et al. | 74/473 R |

FOREIGN PATENT DOCUMENTS

| | | | |
|---|---|---|---|
| 202464 | 3/1959 | Fed. Rep. of Germany. | |
| 48-19691[U] | of 1973 | Japan. | |
| 5100466 | 7/1980 | Japan | 74/473 R |
| 1183796 | 3/1970 | United Kingdom | 74/473 R |
| 1274334 | 5/1972 | United Kingdom. | |
| 2071237 | 9/1981 | United Kingdom | 74/473 R |

*Primary Examiner*—Lawrence J. Staab
*Attorney, Agent, or Firm*—Lowe, King, Price & Becker

[57] ABSTRACT

In an automotive manual transmission having a common fork shaft on and along which a plurality for shift forks are slidable and a control rod which is rotatable about and slidable along the axis thereof which is normal to the axis of the common fork shaft, there is provided a shaft control mechanism which converts the axial movement of the control rod to a sliding movement of selected one of the shift forks along the axis of the common fork shaft. The shift control mechanism comprises a supporting member removably connected to the transmission housing, a pivoting pin supported by the supporting member and having an axis which is normal to both the axes of the common fork shaft and the control rod, a plurality of pivoting levers pivotally mounted by the pivoting pin so as to be pivotable about the axis of the pivoting pin, one end of each pivotting lever being pivotally jointed with an extension of the corresponding one of the shift forks to cause movement of the corresponding shift fork on and along the common fork shaft upon pivoting movement of the pivotting lever, and a head member secured to the control rod, the head member being brought into engagement with the other end of each pivoting lever upon rotational movement of the control rod about its axis into a given position.

5 Claims, 9 Drawing Figures

SHIFT CONTROL MECHANISM OF AN AUTOMOTIVE MANUAL TRANSMISSION

BACKGROUND OF THE INVENTION

1. Field of the Invention

The present invention relates in general to a control mechanism of an automotive transmission, and more particularly to a shift control mechanism of a manual transmission which is particularly adaptable for use in a front-wheel-drive automotive vehicle having a transversely mounted engine.

2. Description of the Prior Art

In the transmission of the type mentioned above, the shift control mechanism is so arranged that the control rod actuated by the manual shift level in the vehicle cabin extends perpendicular to the fork shaft on which the shift forks slide axially. Thus, a so-called direction changing device is equipped between the control rod and the shift forks, which functions to convert the axial movement of the control rod to a sliding movement of selected one of the shift forks along the axis of the fork shaft. One of the direction changing devices is disclosed in Japanese laid-open Utility Model Application No. 48-19691, which comprises a plurality of L-shaped pivoting levers which are pivotally mounted on a common pivoting pin directly secured to the housing of the transmission, one end of each pivoting lever being pivotally jointed with an extension of the corresponding shift fork and the other end of the lever being selectively engageable with a head member secured to the control rod, so that upon a selecting operation of the control rod achieved by rotation thereof about its axis, the head member is brought into engagement with the other end of a selected pivoting lever, and upon a shifting operation of the rod achieved by the axial movement thereof after the selecting operation, the selected pivotting lever is rotated about the common pivoting pin in a given direction to move the corresponding shift fork along the fork shaft thereby to establish a given gear ratio. However, because of the inherent arrangement of the device of that application (originating from the fact that the common pivoting pin for the pivoting levers is directly secured to the transmission housing), the mounting of the pivoting levers to the transmission housing is obliged to take an assembling procedure wherein the pivoting levers are individually and by turns mounted to the common pivoting pin which is previously secured to the transmission housing. This assembling procedure is time-consuming work or troublesome and causes difficulty in positioning the pivotting levers into predetermined proper positions in the transmission housing. In fact, it often becomes necessary to readjust their positions after assembly of them in the housing.

SUMMARY OF THE INVENTION

Therefore, it is an object of the present invention to provide an improved shift control mechanism of a manual transmission adapted for use with a transversely mounted engine, which mechanism is free of the above-mentioned troublesome work and drawbacks.

According to the present invention, there is provided, in an automotive manual transmission having a common fork shaft on and along which a plurality of shift forks are slidable and a control rod which is rotatable about and slidable along the axis thereof which is normal to the axis of the common fork shaft, a shift control mechanism which comprises a supporting member removably connected to the housing of the transmission, a pivoting pin supported by the supporting member and having an axis which is normal to both the axes of the common fork shaft and the control rod, a plurality of pivoting levers pivotally mounted by the pivotting pin so as to be pivotable about the axis of the pivoting pin, one end of each pivoting lever being pivotally joined with an extension of the corresponding one of the shift forks to cause movement of the corresponding shift fork on and along the common fork shaft upon pivoting movement of the pivotting lever, and a head member secured to the control rod to be movable therewith, the head member being brought into engagement with the other end of each pivoting lever upon rotational movement of the control rod about its axis into a given position.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
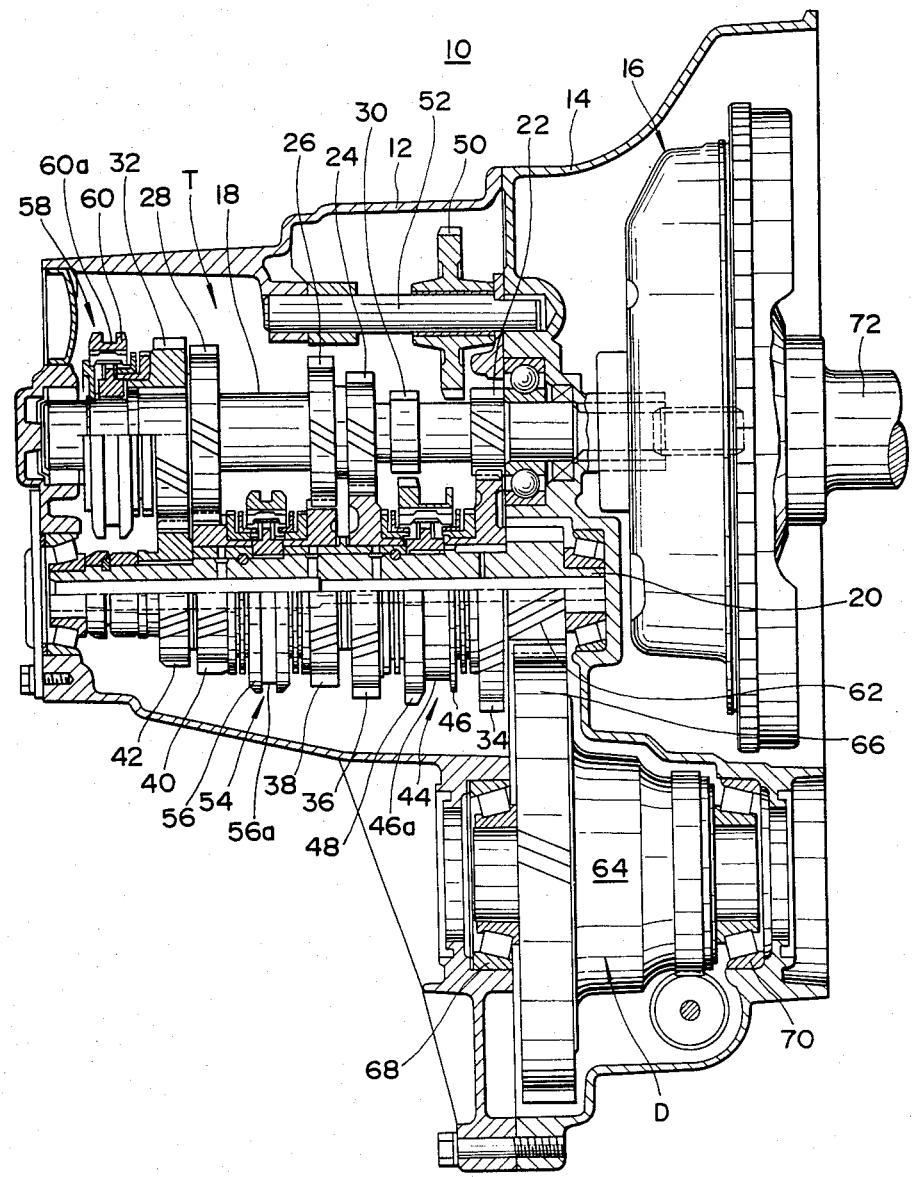
FIG. 1 is a longitudinal section view of a manual transmission equipped with a shift control mechanism according to the present invention, some parts being shown dislocated for clarification of the drawing.
Figure 2:
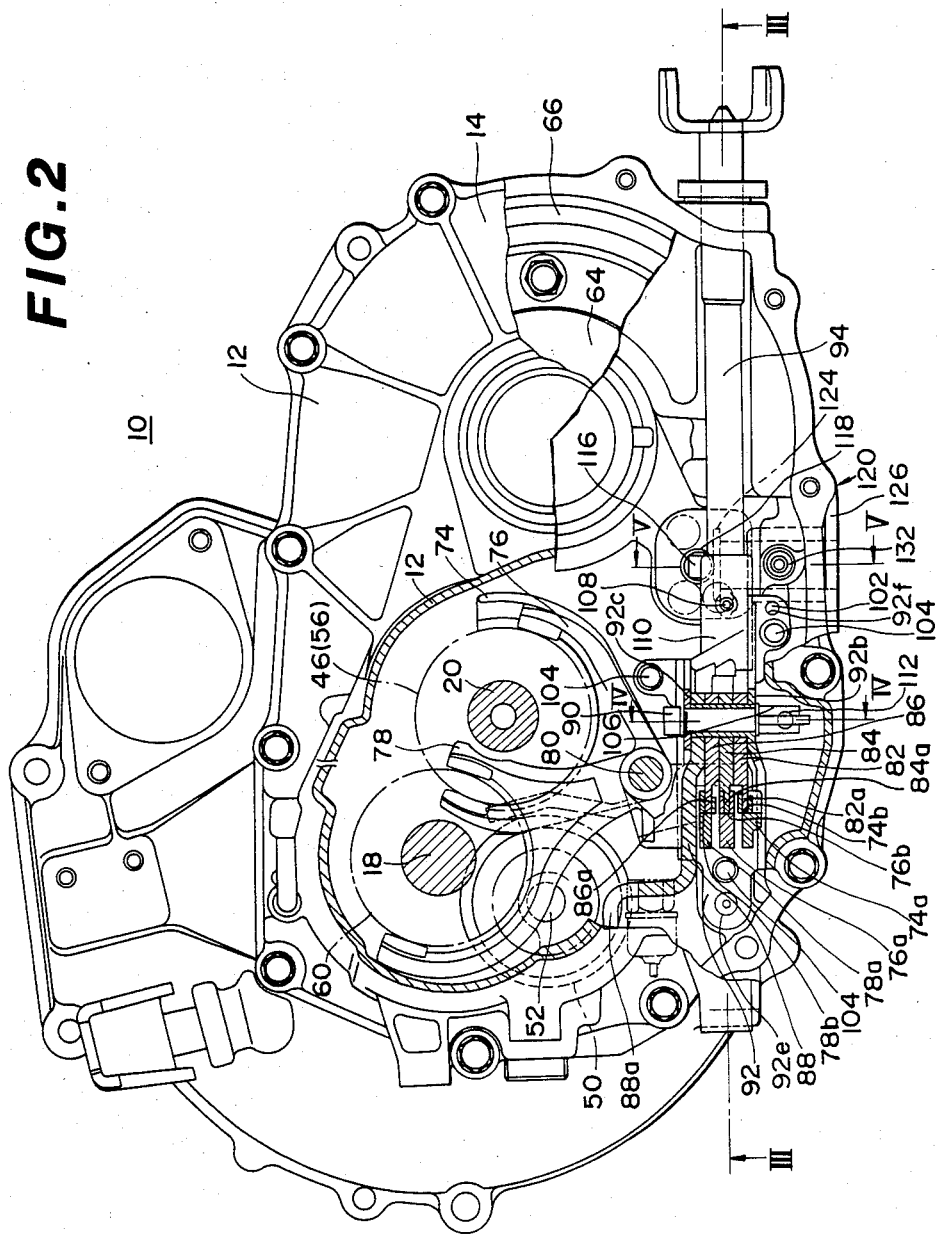
FIG. 2 is a transverse section view of the transmission, showing an essential portion of the shift control mechanism of the present invention.
Figure 3:
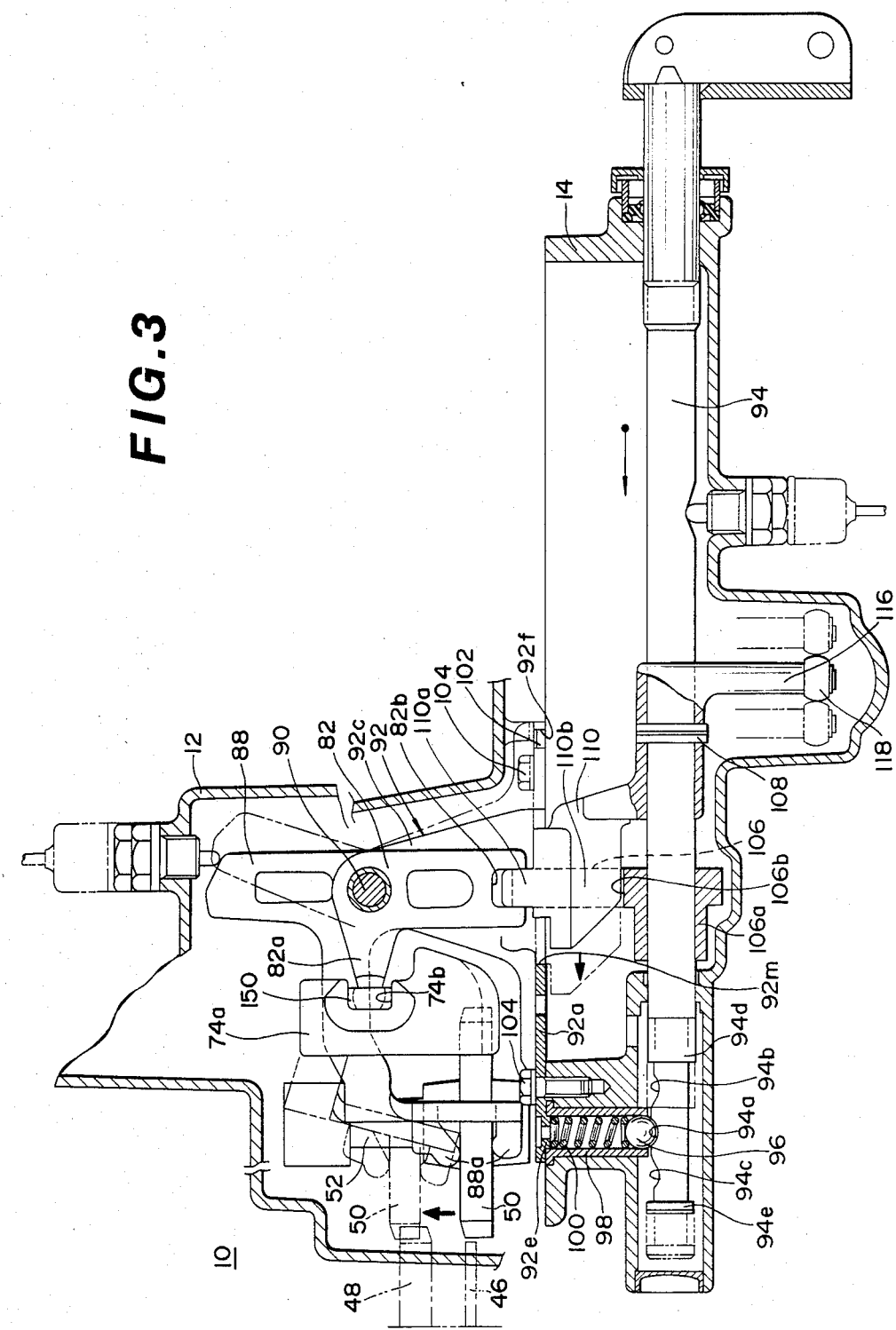
FIG. 3 is a sectional view taken along the line III—III of FIG. 2.

Referring to FIGS. 1 to 3, particularly FIG. 2, there is shown generally a transaxle assembly 10 adapted for use in a front-wheel-drive motor vehicle having a transversely mounted engine, in which assembly a shift control mechanism according to the present invention is incorporated. The transaxle assembly 10 is a single unit including a transmission T and a differential gear D as is seen from FIG. 1.

The transaxle assembly 10 comprises housings 12 and 14 which are united to mount therein gear trains of the transmission T as well as gears of the differential D. The housing 14 also acts as a housing for a clutch 16.

Within the housing 12, there are parallelly arranged an input shaft 18 and an output shaft 20 which are rotatable about the respective axes thereof relative to the housing. The input shaft 18 is adapted to receive torque from the engine through the clutch 16. Defined by or secured to the input shaft 18 is a first speed input gear 22, a second speed input gear 24, a third speed input gear 26, a fourth speed input gear 28 and a reverse input gear 30. A fifth speed input gear 32 is journalled on the input shaft 18. Journalled on the output shaft 20 a first speed output gear 34, a second speed output gear 36, a third speed output gear 38 and a fourth speed output gear 40 which constantly mesh with the first, second, third and fourth speed input gears 22, 24, 26 and 28, respectively. A fifth speed output gear 42 is splined to the output shaft 20 in constant mesh with the fifth speed input gear 32.

A first-second synchronizing clutch mechanism 44 is slidably supported on the output shaft 20, which functions to smoothly connect either the first speed output gear 34 or the second speed output gear 36 to the output shaft 20 thereby to establish the first or second forward gear ratio. A coupling sleeve 46 of the mechanism 44 is formed at its periphery with a reverse idler gear 48 which is meshingly engageable with the reverse input gear 39 through a reverse idler gear 50 (which is shown dislocated in FIG. 1 for clarification of the drawing). The reverse idler gear 50 is rotatably and axially slidably mounted on a stationary shaft 52 which is parallel to the input and output shafts 18 and 20.

A similar third-fourth synchronizing clutch mechanism 54 is slidably supported on the output shaft 20, which functions to smoothly connect either the third speed output gear 38 or the fourth speed output gear 40 to the output shaft 20 thereby to establish the third or fourth forward gear ratio. Designated by numeral 56 is a coupling sleeve of the mechanism 54 which is shiftable rightward and leftward in FIG. 1.

A fifth synchronizing clutch mechanism 58 is slidably supported on the input shaft 18 for smoothly connecting the fifth speed input gear 32 to the input shaft 18 thereby to establish the fifth forward gear ratio. In particular, when a coupling sleeve 60 of this mechanism 58 is shifted rightward in FIG. 1, the fifth speed input gear 32 meshing with the fifth speed output gear 42 becomes into driving connection with the input shaft 18.

A drive pinion 62 is defined by or secured to the output shaft 20. The drive pinion 62 meshes with a ring gear 66 secured to a casing 64 of the differential gear D thereby to constitute a final drive mechanism. The differential gear casing 64 is rotatably supported at its axial both ends by the housings 12 and 14 through thrust bearings 68 and 70 which are mounted in the housings 12 and 14, respectively. Although not shown in the drawing (FIG. 1), a pair of road wheel driving shafts are inserted at their inside ends into the casing 64 from the axial ends of the casing and respectively engaged with side gears (not shown) of the differential gear D.

In the above-described construction, the engine output which is transmitted from an engine crank shaft 72 to the input shaft 18 through the clutch 16 rotates the first, second, third and fourth speed output gears 34, 36, 38 and 40 through the first, second, third and fourth speed input gears 22, 24, 26 and 28. However, as far as the coupling sleeves 46, 56 and 60 and the reverse idler gear 50 take the respective rest positions as shown in FIG. 1, the engine power is not transmitted to the output shaft 20 thereby keeping the transmission T in a neutral condition.

When the coupling sleeve 46 is shifted rightward in FIG. 1, the first speed output gear 34 meshing with the first speed input gear 22 becomes into driving connection with the output shaft 20, so that the engine power is transmitted to the driving wheels (not shown) through the first speed input gear 22, the first speed output gear 34, the drive pinion 62, the ring gear 66 and the differential gear D thereby to establish a first forward gear ratio. Similar to this, when the coupling sleeve 46 is shifted leftward, a second forward gear ratio is established.

When the coupling sleeve 56 is shifted rightward in FIG. 1, the third speed output gear 38 meshing with the third speed input gear 26 becomes into driving connection with the output shaft 20 thereby to establish a third forward gear ratio, while, when the coupling sleeve 56 is shifted leftward, the fourth speed output gear 40 meshing with the fourth speed input gear 28 becomes into driving connection with the output shaft 20 thereby to establish a fourth forward gear ratio.

When the coupling sleeve 60 is shifted rightward in FIG. 1, the fifth speed input gear 32 meshing with the fifth speed output gear 42 becomes into driving connection with the input shaft 18 to be rotatable therewith, so that the engine power is transmitted to the driving wheels through the fifth speed input gear 32, the fifth speed output gear 42 splined to the output shaft 20, the drive pinion 62, the ring gear 66 and the differential gear D thereby to establish a fifth forward gear ratio.

When the reverse idler gear 50 is shifted leftward in FIG. 1 to engage with both the reverse input gear 30 and the reverse output gear 48, the engine power is transmitted to the driving wheels through the reverse input gear 30, the reverse idler gear 50, the reverse output gear 48, the drive pinion 62, the ring gear 66 and the differential gear D thereby to establish a reverse condition.

The shift control mechanism of the present invention, which conducts the above-mentioned operation, has a construction which will be described hereinnext.

As is best seen from FIG. 2, a common shift fork shaft 80 is arranged in the housing in a manner to be parallel with the input and output shafts 18 and 20. Three shift forks 74, 76 and 78 constructed of aluminum are slidably mounted at their hub sections on the common fork shaft 80 in this order. The shift forks 74, 76 and 78 are operatively engaged with the annular grooves 46a, 56a and 60a (see FIG. 1) of the coupling sleeves 46, 56 and 60, respectively, for shifting these coupling sleeves rightward or leftward in FIG. 1. Each of the shift forks 74, 76 and 78 is formed with an extension 74a, 76a or 78a. The extensions 76a and 78a extend along the fork shaft 80 in the same direction. As will be understood from FIG. 2, the extension 76a is placed between the extension 74a and the extension 78a which is placed at the highest position among the three. For the reason which will become clear hereinafter, the extensions 74a, 76a and 78a are respectively formed at their leading ends with recesses 74b, 76b and 78b which face toward the same direction, that is, toward a motion transmitting mechanism. As will be described hereinnext, the motion transmitting mechanism functions to transmit the motion of a manually operated control rod 94 to one of the shift forks 74, 76 and 78 thereby shifting the corresponding coupling sleeve 46, 56 or 60 in such a manner as is mentioned hereinabove.

The motion transmitting mechanism comprises first, second, third and fourth pivoting levers 82, 84, 86 and 88 which have substantial equal thickness and are pivotally mounted on a common pin 90 in this order so as to be pivotal about the axis of the pin 90. In the present embodiment, the first, second and third pivoting levers 82, 84 and 86 are identical in shape. As will become clear as the description proceeds, the pin 90 is arranged normal to the axis of the common shift fork shaft 80. The first, second and third pivoting levers 82, 84 and 86 are respectively formed with first arm portions 82a, 84a and 86a which are respectively and jointly received in the afore-mentioned recesses 74b, 76b and 78b of the shift fork extensions 74a, 76a and 76a to form therewith respective articulated connections. The leading ends of the arm portions 82a, 84a and 86a are equipped with caps 150 (see FIG. 3) or sintered alloy or suitable plastics for effecting abrasion protection. As is seen from FIG. 3, the fourth pivoting lever 88 has an elongate extension 88a which is bifurcated straddling the reverse idler gear 50.

Figure 6:
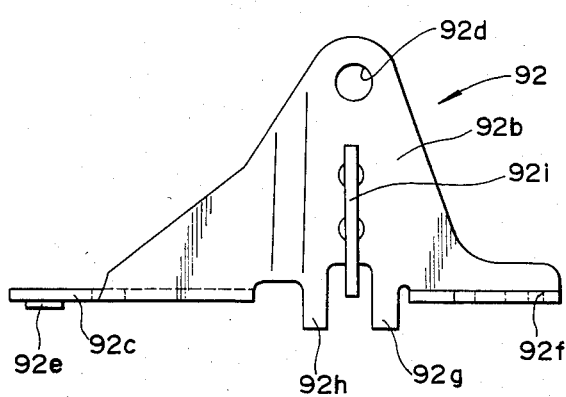
FIG. 6 is a side view of a bracket for mounting pivotting levers therein.
Figure 7:
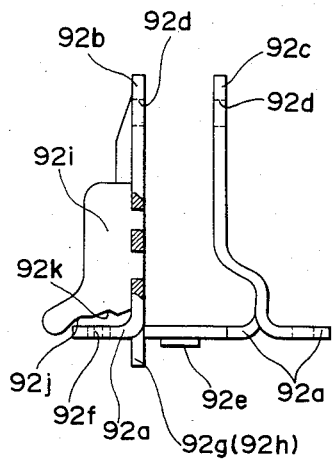
FIG. 7 is a partially broken front view of the bracket.

The unit consisting of the first, second, third and fourth pivoting levers 82, 84, 86 and 88 and the common pin 90 is housed in a supporting member or generally U-shaped bracket 92 which is secured to the housing 14. As is understood from FIGS. 6 and 7 and FIG. 2, the common pin 90 passes through aligned holes 92d respectively formed in spaced side walls 92b and 92c of the bracket 92. The bottom wall 92a of the bracket 92 is formed at spaced sections thereof with three holes (no numerals) through which later-mentioned three bolts 104 are respectively passed. Further, the bottom wall 92a of the bracket 92 is formed at its outer surface with a circular projection 92e, and a positioning hole 92f. As will be understood from FIGS. 2 and 5, the bracket 92 is secured to the housing 14 by the three bolts 104 passing through the three holes of the bracket bottom wall 92a and is arranged so that the first, second, third and fourth pivoting levers 82, 84, 86 and 88 are pivotable about the common pin 90 along respective planes parallel to the axis of the common fork shaft 80. As is seen from FIGS. 2 and 3, securing the bracket 92 to the housing 14 is so made that the circular projection 92e of the bottom wall 92a is put in one open end of a later-mentioned sleeve 98 and the positioning hole 92f of the bottom wall 92a puts therein a positioning pin 102 secured to the housing 14.

As is seen from FIGS. 2 and 3, a control rod 94 is arranged in the housing 14 in such an arrangement that the axis thereof is normal to the axis of the common fork shaft 80. The control rod 94 is rotatable about and slidable along the axis thereof. One end of the control rod 94 is projected outwardly from the housing 14 and connected through a suitable linkage to a conventional manual shift lever (not shown) located in a vehicle cabin. It is to be noted that the selecting operation of the manual shift lever induces rotation of the control rod 94 about the axis thereof and the shifting operation of the manual shift lever induces sliding movement of the control rod 94 along the axis thereof. As is seen from FIG. 3, the control rod 94 is formed at its inwardly leading end portion with three spaced notches 94a, 94b and 94c. A detent ball 96 is slidably received in the afore-mentioned sleeve 98 which is tightly received in a bore (no numeral) formed in the housing 14. A spring 100 is put in the sleeve 98 to bias the detent ball 96 toward the control rod 94. With the detent ball 96 engaged in one of the notches 94a, 94b and 94c, the control rod 94 is restrained in one of its longitudinal positions.

As is understood from FIG. 3, the pivoting levers 82, 84, 86 and 88 are of a bell crank type, and they have at the leading ends of second arm portions thereof respective recesses 82b, 84b, 86b and 88b, the recesses being aligned when all the pivotting levers 82, 84, 86 and 88 are in their neutral or rest positions.

An interlock is provided to ensure that only one pivoting lever 82, 84, 86 and 88 is moved at any given time. A generally sectorial interlock plate 106 is rotatably disposed at its hub section 106a on the control rod 94 with its arcuate free end section slidably received in the aligned recesses 82b, 84b, 86b and 88b of the pivotting levers. As will be understood from FIGS. 4, 5, 6 and 7, the sectorial section of the interlock plate 106 is put between two lug portions 92g and 92h (see FIG. 6) of the bracket 92 so as to restrain the axial movement of the interlock plate 106 along the control rod 94. As is seen from FIG. 8, the interlock plate 106 is formed with a stepped recess 106b which leads to the arcuate free end section. The width of the mouth portion of the recess 106b is equal to or less than the thickness of each pivotting lever. As is seen from FIGS. 8 and 9, a blind hole 106c is formed in the interlock plate 106 extending toward the hub section 106a.

Figure 4:
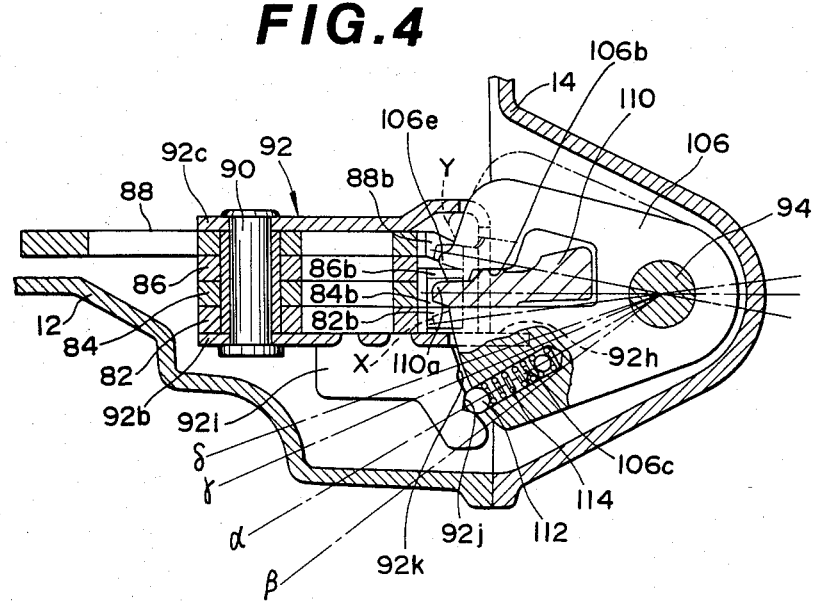
FIG. 4 is a sectional view taken along the line IV—IV of FIG. 2.

As is best seen from FIG. 3, a control head member 110 is secured at its hub section to the control rod 94 by means of a connecting pin 108 to be movable therewith. The control head member 110 has a shank portion 110b which extends along the control rod 94 leaving a space therebetween. The shank portion 110b is slidably received in the afore-mentioned stepped recess 106b of the interlock plate 106. Thus, it will be appreciated that the rotation of the control head member 110 with the control rod 94 about the axis of the rod 94 induces a simultaneous rotation of the interlock plate 106, but, the axial movement of the control head member 110 with the control rod 94 does not induce the axial movement of the interlock plate 106. The shank portion 110b of the control head member 110 is formed with a head proper 110a which projects radially outwardly but slightly from the stepped recess 106b of the interlock plate 106 to be received in one of the afore-mentioned recesses 82b, 84b, 86b and 88b of the pivoting levers 82, 84, 86 and 88. As is seen from FIG. 9, a detent ball 112 is slidably received in the blind hole 106c of the interlock plate 106. A spring 114 is put in the hole 106c to bias the ball 112 toward a notched plate 92i secured to the bracket 92 in a manner as is depicted by FIG. 4. The arrangement of the notched plate 92i relative to the bracket 92 is clearly shown by FIGS. 6 and 7. As is seen from FIGS. 4 and 7, the notched plate 92i is formed with a notch 92j and a step 92k with which the detent ball 112 is engageable. With the detent ball 112 engaged in the notch, the interlock plate 106 is restrained in a predetermined angular position. With this arrangement, a so-called select check mechanism is provided, which gives the driver a detent feeling when he or she carries out the selecting operation.

Figure 8:
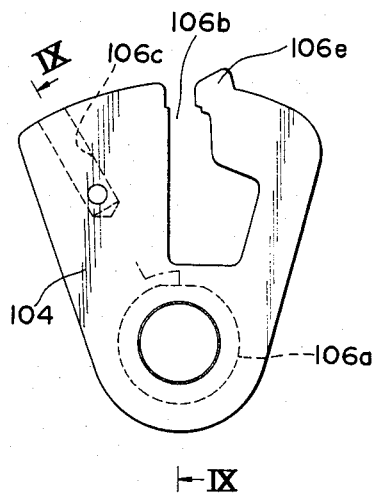
FIG. 8 is a front view of an interlocking plate.
Figure 9:
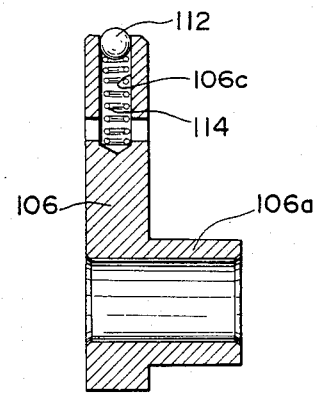
FIG. 9 is an enlarged sectional view taken along the line IX—IX of FIG. 8.

As is best seen in FIG. 8, the interlock plate 106 is formed, at the arcuate free end section near the mouth of the recess 106b, with a projection 106e which serves to limit rotation of the interlock plate 106 about the control rod 94 as will become clear hereinafter.

As is seen from FIG. 3, the control head member 110 is formed, at a side opposite to the shank portion 110b, with an arm 116 of which leading end is equipped with a roller 118 which are parts of a next-mentioned select return mechanism which functions to impose the shift lever operator (driver) a slightly greater effort to move the shift lever when he or she selects the fifth forward speed position or the reverse position. As is seen from FIG. 5, the roller 118 is associated with a biasing unit 120. The unit 120 comprises a holder 122 secured to the housing 14. A piston 124 is slidably received in the holder 122 and a spring 126 is set in the holder 122 to bias the piston 124 to abut against the roller 118. Designated by numeral 128 is a stopper pin which is secured to the holder 122 and projected into an axially extending recess 124c of the piston 124 for limiting the movement of the piston 124. The piston 124 is formed at its cylindrical outer side with an axially extending recess 124a which opens to a hole 122a formed in the holder 122. A detent ball 130 is slidably received in the hole 122a in a manner to be projected into the recess 124a. The ball 130 is biased toward the recess 124a by means of a spring 134 and another ball 136 which are received in a hole 14a defined by the housing 14, the hole 14a being plugged with a bolt 132.

In the following, operation of the shift control mechanism of the present invention will be described.

In order to facilitate the description of the operation, it will be commenced with respect to a condition wherein the control rod 94 is in a neutral position, in both selecting (rotating) and shifting (sliding) movements, as is shown by FIGS. 2 to 5. In this condition, the detent ball 112 (see FIG. 4) carried by the interlock plate 106 is engaged with the notch 92j of the plate 92i to restrain the control rod 94 in a settled position in rotating movement of the rod 94, and the arm 116 (see FIG. 5) of the select return mechanism takes a position indicated by solid line wherein the roller 118 engages the piston 124 which takes its uppermost position. Further, in this condition, the head proper 110a of the control head member 110 is engaged with the recess 84b of the second pivoting lever 84, and as is seen from FIG. 3, the detent ball 96 is engaged with the center notch 94a of the control rod 94 to restrain the control rod 94 in a settled position in sliding movement of the rod 94. Furthermore, in this condition, the coupling sleeves 46, 56 and 60 and the reverse idler gear 50 take the respective positions as shown by FIG. 1, so that the engine power is not transmitted to the differential gear D thereby holding the vehicle in a halt.

Figure 5:
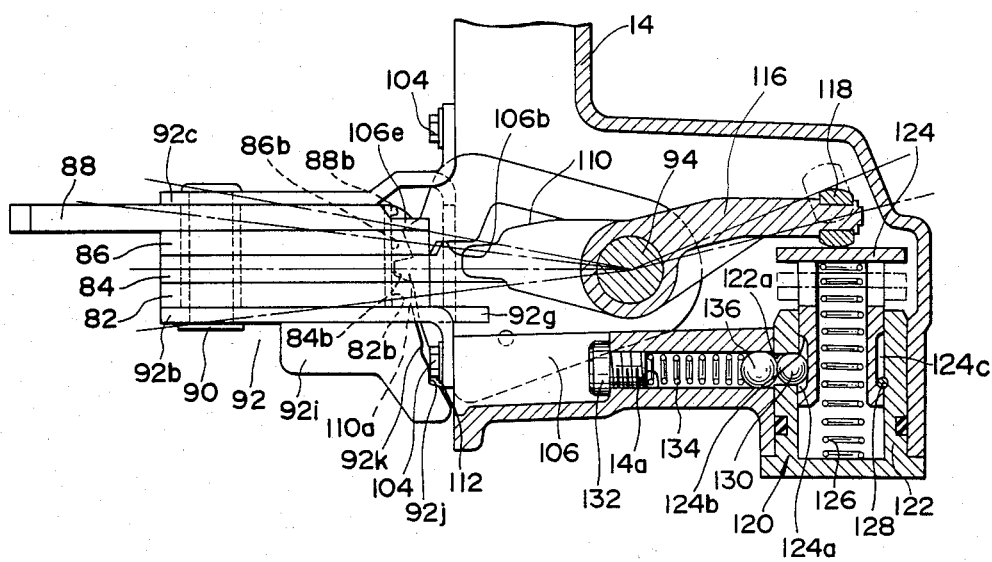
FIG. 5 is a sectional view taken along the line V—V of FIG. 2.

When now the control rod 94 is rotated about its axis in a counterclockwise direction in FIGS. 4 and 5, the control head member 110 rotated together with the rod 94 brings about a counterclockwise rotation of the interlock plate 106 moving detent ball 112 from a position on the line $\alpha$ (see FIG. 4) to a position on the line $\beta$. During this operation, a detent feeling is given because the detent ball 112 is pushed against the biasing force of the spring 114, and when the head proper 110a of the control head member 110 comes to a position indicated by broken line X in FIG. 4 and contacts a portion of the bracket 92, the operator (driver) can recognize that the control rod 94 has come to a temporary position for the first or second forward gear ratio, in which position the head proper 110a is received in the recess 82b of the first pivoting lever 82. When then the control rod 94 is axially moved in the rightward direction in FIGS. 2 and 3, the first pivoting lever 82 is rotated about the pin 90 in a counterclockwise direction in FIG. 3 thereby shifting through the shift fork 74 the coupling sleeve 46 in the rightward direction in FIG. 1. Thus, as has been mentioned hereinafore, the first forward gear ratio is established. While, when the control rod 94 in the temporary position is axially moved in the leftward direction in FIGS. 2 and 3, the lever 82 is rotated in a clockwise direction in FIG. 3 thereby shifting the coupling sleeve 46 in the leftward direction in FIG. 1. Thus, the second forward gear ratio is established. Although not shown in the drawings, a conventional return spring is mounted to the control rod 94 for ease with which the shifting operation of the control rod 94 for the first or second forward gear ratio is achieved.

During the above-mentioned operation, the detent ball 96 (see FIG. 3) is forced to move from the center notch 94a to the notch 94c or the notch 94b compressing the spring 100. Thus, a detent feeling is given at the sliding movement of the rod 94.

When the control rod 94 in the above-mentioned neutral position is axially moved in the rightward direction in FIGS. 2 and 3, the second pivoting lever 84 is rotated about the pin 90 in a counterclockwise direction in FIG. 3 thereby shifting, through the shift fork 76, the coupling sleeve 56 in the rightward direction in FIG. 1. Thus, the third forward gear ratio is established as has been described hereinabove. When the control rod 94 in the neutral position is axially moved in the leftward direction in FIGS. 2 and 3, the second pivoting lever 84 is rotated in a clockwise direction in FIG. 3 thereby shifting the coupling sleeve 56 in the leftward direction in FIG. 1. Thus, the fourth forward gear ratio is established.

During this shifting operation, the detent feeling is also given by the spring-biased detent ball 96 similar to the case of the above-mentioned operation to the first or second forward gear ratio.

When the control rod 94 in the neutral position is rotated about the axis thereof in a clockwise direction in FIGS. 4 and 5, the control head member 110 rotated together with the rod 94 brings about a clockwise rotation of the interlock plate 106 moving the detent ball 112 from the position on the line $\alpha$ (see FIG. 4) to a position on the line $\gamma$. At this time, a detent feeling is given because the detent ball 112 is pushed against the biasing force of the spring 114 and is brought into contact with the step 92k of the notched plate 92i. During this operation, the arm 116 (see FIG. 5) extending from the control head member 110 is rotated about the axis of the control rod 94 in a clockwise direction in FIG. 5 pushing via the roller 118 the piston 124 against the force of the spring 126 into a position wherein one end 124b of the groove 124a of the piston 124 contacts the detent ball 130. This operation also gives a detent feeling. When the detent feeling is given, the operator (driver) can recognize that the head proper 110a of the control head member 110 has come to a temporary position to be received in the recess 86b of the third pivoting lever 86. When, then, the control rod 94 is axially moved in the rightward direction in FIGS. 2 and 3, the third pivoting lever 86 is rotated about the pin 90 in a counterclockwise direction in FIG. 3 thereby moving, through the shift fork 78, the coupling sleeve 60 in the rightward direction in FIG. 1. Thus, the fifth forward gear ratio is established.

During this shifting operation, a detent feeling is given by a fact that the detent ball 96 is forced to move from the notch 94a to the notch 94c against the biasing force of the spring 100.

When the control rod 94 in the neutral position is rotated by a great degree about the axis thereof in a clockwise direction in FIGS. 4 and 5 exceeding the temporary position for the fifth forward gear ratio, the detent ball 112 carried by the interlock plate 106 is moved from the position on the line $\alpha$ to a position on the line $\delta$ riding over the step 92k. During this operation, the arm 116 (see FIG. 5) of the control head member 110 is greatly rotated about the axis of the control rod 94 in a clockwise direction in FIG. 5 pushing via the roller 118 the piston 124 against the force of the spring 126 by a degree to cause the detent ball 130 to ride over the end 124b of the recess 124a. With the detent ball 130 riding over the recess 124a, a detent feeling is given so that the operator (driver) can recognize that the control rod 94 has passed the temporary position for the fifth forward gear ratio. When the control rod 94 is still further rotated in the same direction, the projection 106e of the interlock plate 106 comes to a position indicated by a phantom line Y in FIG. 4 and contacts a portion of the bracket 92 so that the operator (driver) can recognize that the control rod 94 has come to a temporary position for the reverse gear ratio. In this condition, the head proper 110a of the control head member 110 is received in the recess 88b of the fourth pivoting lever 88. Thus, when then the control rod 94 is axially moved in the leftward direction in FIGS. 2 and 3, the fourth pivoting lever 88 is rotated about the pin 90 in a clockwise direction in FIG. 3, thereby moving the reverse idler gear 50 from the position indicated by solid line to the position indicated by phantom line. That is, the reverse idler gear 50 is shifted leftward in FIG. 1 to engage with both the reverse input gear 30 and the reverse output gear 48 to establish the reverse condition.

During this shifting operation, a detent feeling is given by a fact that the detent ball 96 (see FIG. 3) is forced to move from the notch 94a to the notch 94b against the biasing force of the spring 100.

As is understood from the above, the shifting operation to the fifth forward gear ratio and the reverse gear ratio is made with the arm 116 of the control head member 110 pushing the spring-biased piston 124 of the select return mechanism. However, this shifting operation is smoothly made because of provision of the roller 118 which runs on the piston 124 during such shifting. The shifting or returning operation to the neutral position from the positions for the fifth forward gear ratio and the reverse gear ratio is easily made with a reduced operating force because of assistance of the force produced by the compressed spring 126. In short, a so-called select returning function is achieved.

Even when the operator (driver) intends to carry out the shifting operation with the control rod 94 taking an angular position other than the above-mentioned predetermined temporary positions, the shifting is suppressed because in such a condition the stepped recess 106b of the interlock plate 106 fails to align with any of the recesses 82b, 84b, 86b and 88b of the first, second, third and fourth pivoting levers 82, 84, 86 and 88 thereby blocking the movement of these levers 82, 84, 86 and 88 about the pin 90.

The axial moving distance of the control rod 94 is adjusted by, as is seen from FIG. 3, abutting a shoulder portion 94d of the rod 94 against the downwardly projected portion of the sleeve 98, abutting the control head member 110 against an edge 92m of the bracket bottom wall 92a, and abutting a flanged end 94e of the rod 94 against the projected portion of the sleeve 98. With this, a so-called shift stopper is provided.

Although in the foregoing description, the selecting operation is established by the rotation of the control rod 94 about the axis thereof and the shifting operation is established by the axial movement of the same, it is also possible that the shifting operation is made by the rotation of the rod 94 and the selecting operation is made by the axial movement of the rod. However, in the latter case, the bracket 92 should be so arranged that the longitudinal axis thereof is normal to the axis of the control rod 94.

As is described hereinabove, the shift control mechanism of the present invention has a unique arrangement in which the first, second, third and fourth pivoting levers 82, 84, 86 and 88 are all mounted to a single bracket 92 via a common pin 90. Thus, in assembling of the transaxle, the pivoting levers can be subassembled in the bracket 92 prior to mounting to the housing of the transmission T. Accordingly, in the present invention, the afore-mentioned troublesome work necessitated in assembling the conventional shift control mechanism (originating from the individual mounting work with which the pivoting levers are mounted to the housing) is no longer required. Further, because the positioning of the pivoting levers relative to the associated parts (such as the control rod 94 and the shift forks 74, 76 and 78) is completed at the time when the pivoting levers-assembled bracket 92 is mounted to the housing 14, the afore-mentioned troublesome work originating from the individual adjusting of the position of each pivoting lever after mounting to the transmission housing is no longer necessitated. Furthermore, because the pivoting levers are all supported on a common pin 90, the relative positioning between adjacent two of the levers is achieved precisely.

What is claimed is:

1. In an automotive manual transmission having a common fork shaft on and along which a plurality of shift forks are slidable and a control rod which is rotatable about and slidable along the axis thereof which is normal to the axis of said common fork shaft, a shift control mechanism subassembly comprising:

a generally U-shaped bracket removably connected to a housing of said transmission, said bracket having a pair of side walls connected by a bottom wall;

a pivoting pin supported by said bracket, said pin having opposite ends received in the bracket side walls, said pin having an axis which is normal to both the axes of said common fork shaft and said control rod;

a plurality of pivoting levers pivotally mounted on said pivoting pin so as to be pivotable about the axis of said pivoting pin, one end of each pivoting lever being pivotally jointed with an extension of the corresponding one of said shift forks to cause movement of the corresponding shift fork on and along the common fork shaft upon pivoting movement of the pivoting lever, said bracket and pivoting pin permitting subassembly of the pivoting levers on the bracket prior to mounting the bracket within the transmission housing; and a head member secured to said control rod to be movable therewith, said head member being brought into engagement with the other end of a selected one of said pivoting levers upon rotational movement of said control rod about its axis into a predetermined angular position.

2. A shift control mechanism as claimed in claim 1, wherein the bottom wall of said bracket is formed with positioning means for accurately positioning the bracket when securing same to the transmission housing.

3. A shift control mechanism as claimed in claim 2, wherein said positioning means includes a circular projection and a hole respectively formed on and in the bottom wall of the bracket.

4. A shift control mechanism as claimed in claim 1, wherein said one end of each pivoting lever is movably received in a recess formed in said extension of the corresponding shift fork, said other end of each pivoting lever being formed with a recess into which a head proper of said head member is insertable upon rotational movement of said control rod about the axis thereof into a predetermined position.

5. A shift control mechanism as claimed in claim 4, wherein the respective recesses of said other ends of said pivoting levers are aligned with each other when all the pivoting levers are in their neutral or rest positions.

* * * * *